United States Patent [19]

Glass

[11] Patent Number: 4,515,135

[45] Date of Patent: May 7, 1985

[54] HOT FUEL GAS GENERATOR

[75] Inventor: James W. Glass, New Castle, Pa.

[73] Assignee: General Energy Systems, Inc., Youngstown, Ohio

[21] Appl. No.: 568,812

[22] Filed: Jan. 6, 1984

[51] Int. Cl.³ ............................................. F02M 31/00
[52] U.S. Cl. .................................. 123/557; 123/558; 123/25 B; 165/52
[58] Field of Search ............. 123/557, 558, 552, 25 B, 123/25 D, 25 P; 165/52

[56] References Cited

U.S. PATENT DOCUMENTS

| | | | |
|---|---|---|---|
| 2,315,881 | 4/1943 | Thomas | 123/525 |
| 2,746,440 | 5/1956 | Eriksen | 123/557 |
| 3,738,334 | 6/1973 | Farr | 123/557 |
| 4,112,889 | 9/1978 | Harpman | 123/557 |
| 4,350,134 | 9/1982 | Sparks | 123/557 |
| 4,372,280 | 2/1983 | Adams | 123/557 |
| 4,458,653 | 7/1984 | Geddes | 123/557 |

Primary Examiner—Ronald H. Lazarus
Attorney, Agent, or Firm—Harpman & Harpman

[57] ABSTRACT

A hot fuel gas generator for an internal combustion engine of the piston type vaporizes liquid fuel such as gasoline and delivers the same to the engine through a control valve which is responsive in operation to accelerator linkage controlling the internal combustion engine's operation. The hot fuel gas generator uses exhaust gases as a heat source and communicates with an adaptor block mounted on the inlet manifold of the internal combustion engine. A conventional carburetor may be carried on the adaptor block along with a conventional air cleaner as known in the art. The hot fuel gas generator separately makes superheated steam from a controlled amount of water and mixes the steam with the gasified fuel in a mixing chamber which is enclosed in a hollow body member through which hot exhaust gases from the equipped internal combustion engine are directed prior to their delivery to an exhaust system.

7 Claims, 7 Drawing Figures

HOT FUEL GAS GENERATOR

BACKGROUND OF THE INVENTION

1. Field of the Invention:

This invention relates to fuel gas generators for internal combustion engines.

2. Description of the Prior Art:

Fuel systems for internal combustion engines have generally used carburetors in which gasoline is sprayed into a stream of air and divided into a series of fine droplets approaching vaporization and conveyed to the point of combustion. Several attempts to improve vaporization may be seen in U.S. Pat. Nos. 3,968,775 and 4,112,889 wherein typical prior art devices are disclosed. The devices disclosed in these patents were unable to supply a gaseous fuel to an internal combustion engine under all operating conditions. Improved prior art devices for generating and controlling hot fuel gases may be seen in U.S. Pat. Nos. 4,023,538, 4,050,419, 4,114,566, 4,145,998, 4,197,819 and 4,333,422. The inventions disclosed in this group of patents introduced water with the liquid fuel and attempted to simultaneously vaporize the same. Devices formed in accordance with these several patents perform satisfactorily under ideal operating conditions, but were frequently ineffective due to the condensation of the liquid fuel vapor and the steam into droplets which resulted in incomplete combustion of the fuel mixture and occasional stalling of the internal combustion engines equipped with the devices.

The present invention relates to a hot fuel gas generator in the form of a hollow body through which hot exhaust gas from the equipped internal combustion engine is directed prior to its delivery to the conventional exhaust system. A secondary hollow body is disposed within the first mentioned hollow body and positioned out of contact with the walls thereof and a baffle is arranged in the first mentioned hollow body to direct the hot exhaust gases thereabout. Finned tube heat exchangers are positioned within the first hollow body directly in the path of the hot exhaust gases and the tubes of the finned tube heat exchangers extend into the secondary hollow body and communicate with the interior thereof through a plurality of openings formed in the tubes within the second hollow body. A delivery tube communicates with the second hollow body and extends therefrom in an insulating jacket to a mechanical valve controlling access to an adaptor plate engaged on the inlet opening of an inlet manifold on the equipped internal combustion engine. The novel hot fuel gas generator separately vaporizes a liquid hydrocarbon, such as gasoline, and water in the finned tube heat exchangers and delivers the vaporized hydrocarbon and superheated steam into the secondary hollow body about which the hot exhaust gases are circulating to achieve a desirable mixing of the expanding vaporized gasoline and superheated steam which is thus appropriately mixed and delivered by the delivery tube to the internal combustion engine.

SUMMARY OF THE INVENTION

A hot fuel gas generator for an internal combustion engine is disclosed in which gasoline is vaporized to produce a hot gaseous fuel under pressure in a finned tubular heat exchanger and delivered therefrom into a closed hollow body along with superheated steam similarly formed in a separate finned tube heat exchanger. The finned tube heat exchangers and the closed hollow body are positioned in an outer hollow body through which hot exhaust gases from the equipped internal combustion engine are conveyed. A delivery tube communicates with the closed hollow body and extends through an insulated extension to an accelerator controlled measuring valve establishing communication with an adaptor plate which in turn communicates with the inlet manifold of the equipped internal combustion engine and which adaptor plate carries the usual carburetor and air cleaner.

DESCRIPTION OF THE PREFERRED EMBODIMENT

Figure 1:
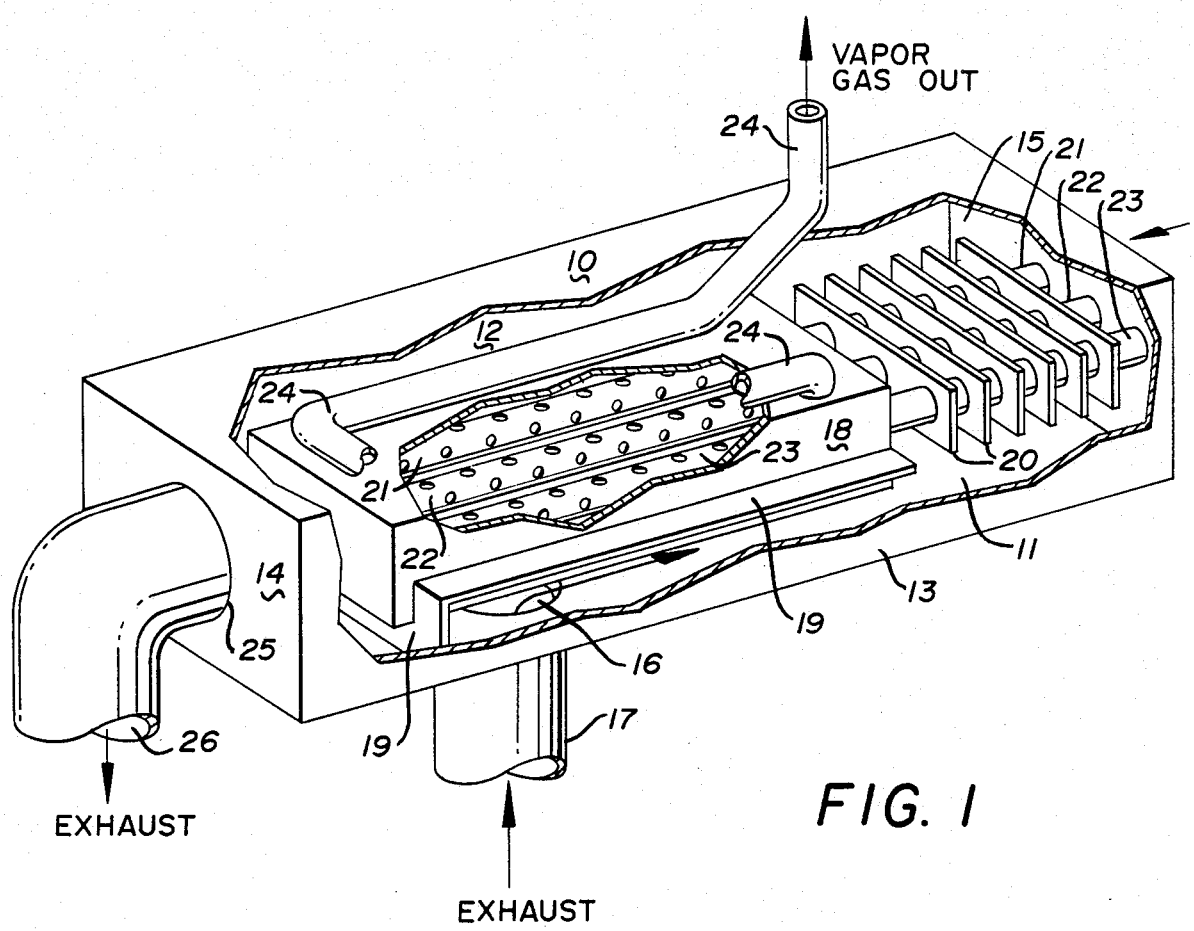
FIG. 1 is a perspective view with parts broken away and parts in cross section illustrating the hot fuel gas generator.

By referring to the drawings and FIG. 1 in particular, a hot fuel gas generator will be seen to comprise an elongated hollow body having top and bottom walls 10 and 11 respectively, side walls 12 and 13 respectively, and end walls 14 and 15 respectively. A relatively large inlet port 16 is formed in the bottom wall 11 inwardly of the end wall 14 and is in communication with a tube 17 through which hot exhaust gases from an internal combustion engine are delivered to the hot fuel gas generator.

Still referring to FIG. 1 of the drawings, it will be seen that a secondary smaller hollow body 18 is positioned within the elongated hollow body defined by the top and bottom walls 10 and 11, the side walls 12 and 13 and the end walls 14 and 15. The secondary hollow body 18 is closed and partially supported in spaced relation to the elongated hollow body in which it is located by a baffle 19 which is horizontally disposed and extends between the sides of the secondary hollow body 18 and the side walls 12 and 13 of the elongated hollow body. A vertical end portion of the horizontal baffle 18 supports the secondary hollow body 18 at an end thereof and between the inlet port 16 in the elongated hollow body and the end wall 14 so that hot exhaust gases entering the inlet port 16 from the tube 17 will engage against the bottom of the secondary hollow body 18 and then flow to the right as seen in FIG. 1 of the drawings and upwardly beyond the right end of the secondary hollow body 18 and through multiple finned tube heat exchangers including a plurality of fins 20 carried on horizontally disposed tubes 21, 22 and 23 respectively. The tubes 21, 22 and 23 extend outwardly of the end wall 15 of the elongated hollow body and communicate with a source of liquid hydrocarbon and water respectively and the tubes 21, 22 and 23 extend into the secondary closed hollow body 18 and extend through the middle portion thereof to a point adjacent the left end thereof and each of the tubes 21, 22 and 23 are perforated. A hot fuel gas delivery tube 24 communicates with an opening in the top of the secondary closed hollow body 18 and extends longitudinally thereof in a U-shape and then outwardly and upwardly through an opening in the top wall 10 of the elongated hollow body member. The hot exhaust gases flow upwardly through the finned tube heat exchangers comprising the fins 20 and tubes 21, 22 and 23 respectively, and then to the left as seen in FIG. 1 of the drawings and over the upper surface of the secondary closed hollow body 18 and around the hot fuel gas delivery tube 24 and exit from the elongated hollow biody through an outlet port 25 in the end wall 14 thereof and into a secondary tube 26 which communicates with the exhaust system of the internal combustion engine in which the hot fuel gas generator is installed.

It will thus be seen that hot fuel gas from the exhaust manifold of the internal combustion engine on which the device is installed enters the elongated hollow body of the hot fuel gas generator through the inlet port 16 at an average temperature of 900° F. and is directed by the baffle 19 along the bottom of the secondary hollow body 18 upwardly through the finned tubes 21, 22 and 23 where a liquid hydrocarbon such as gasoline and water are vaporized, the liquid hydrocarbon being converted to a gaseous state and the water, in one of the tubes, being converted to superheated steam. The gasified hydrocarbon and the superheated steam then flow through the perforations in the tubes 21, 22 and 23 within the secondary closed hollow body 18 into the same where they mix as they continue to expand.

Those skilled in the art will recognize that the gaseous state of the hot fuel gas produced by the hot fuel gas generator represents molecules at the greatest degree of separation from each other providing the greatest opportunity for contact of the reacting species in the gaseous conditions as chemical reactions occur only between particles at the atomic or molecular level and it is necessary for the reacting species to be in actual contact at the time of reaction. The degree of separation of the molecules of the liquid hydrocarbon is increased by the expanding action of the superheated steam and it has been determined that a good working ratio of liquid hydrocarbon, such as gasoline, and water such as from 90% to 96% liquid hydrocarbon and from 10% to 4% water produce a highly efficient hot fuel gas which is capable of almost complete combustion and therefore eliminates the atmospheric pollutants common in the operation of internal combustion engines and substantially increases the energy obtained from the fuel.

The principal point of novelty in the present invention is the hot fuel gas generator just described in connection with the illustration of FIG. 1 of the drawings and the several sections thereof in FIGS. 2, 3, and 4 of the drawings.

The liquid hydrocarbon, such as gasoline, which is unleaded and not provided with any anti-knock compounds, is delivered at low pressure between 1½ lbs. and 7 lbs. per square inch to the tubes 22 and 23 for example, and is immediately gasified by the 900° F. temperature of the exhaust gases flowing upwardly through the space between the tubes 22 and 23 and over the fins 20 bonded thereto. The gasified hydrocarbon then passes into the secondary closed hollow body 18 and emerges thereinto through the perforations in the tubes 22 and 23 which create a series of miniature jets of the gaseous fuel. Simultaneously water in controlled amounts in the foregoing described ratio is supplied to the tube 21 where it instantly converts to superheated steam which is then delivered into the secondary closed hollow body 18 through the performations in the tube 21 within the secondary hollow body 18. The different rates of expansion of the liquid hydrocarbon and the water create different velocities in the miniature jets emerging from the perforated tubes 21, 22 and 23 and create a thorough mixing of the superheated steam and gaseous fuel in the secondary closed hollow body 18 and the resulting hot fuel gas flows into the delivery tube 24 and through the U-shaped loop thereof which is directly exposed to the high temperature of the exhaust gas flowing through the elongated hollow body member and emerges from the hot fuel gas generator where the tube 24 extends through the upper wall 10 thereof.

Figure 2:
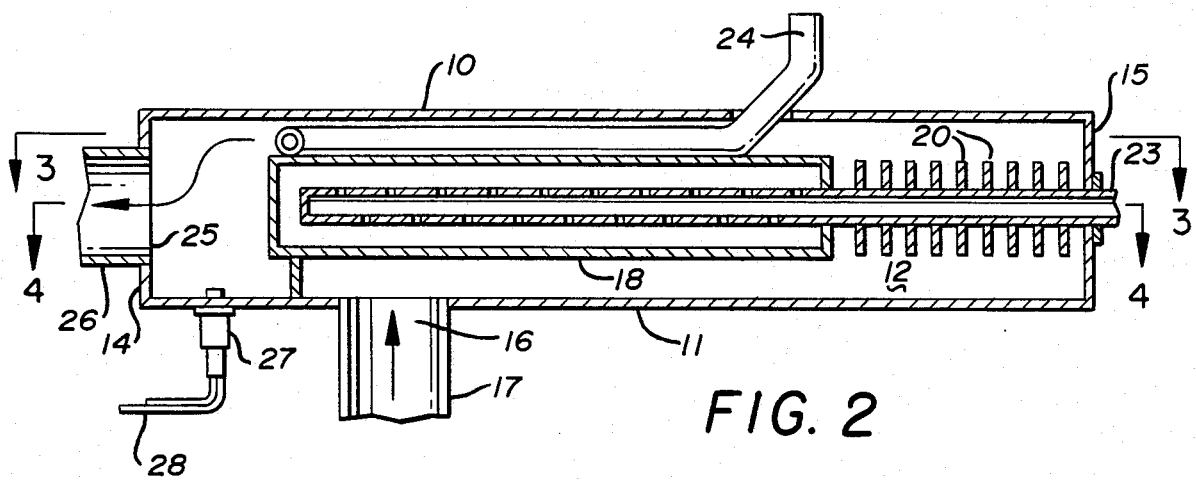
FIG. 2 is a vertical section through the hot fuel gas generator of FIG. 1.

In FIG. 2 of the drawings, a vertical section longitudinally of the hot fuel gas generator of FIG. 1 and taken on the axis of the tube 23 may be seen and arrows in FIG. 2 and FIG. 1 show the directional flow of the hot exhaust gases which comprise the heat used in the hot fuel gas generator.

In FIG. 2 of the drawings, a temperature sensor 27 is illustrated with its associated electrical conductors 28 which connect with simplified control means hereinafter described.

Figure 3:
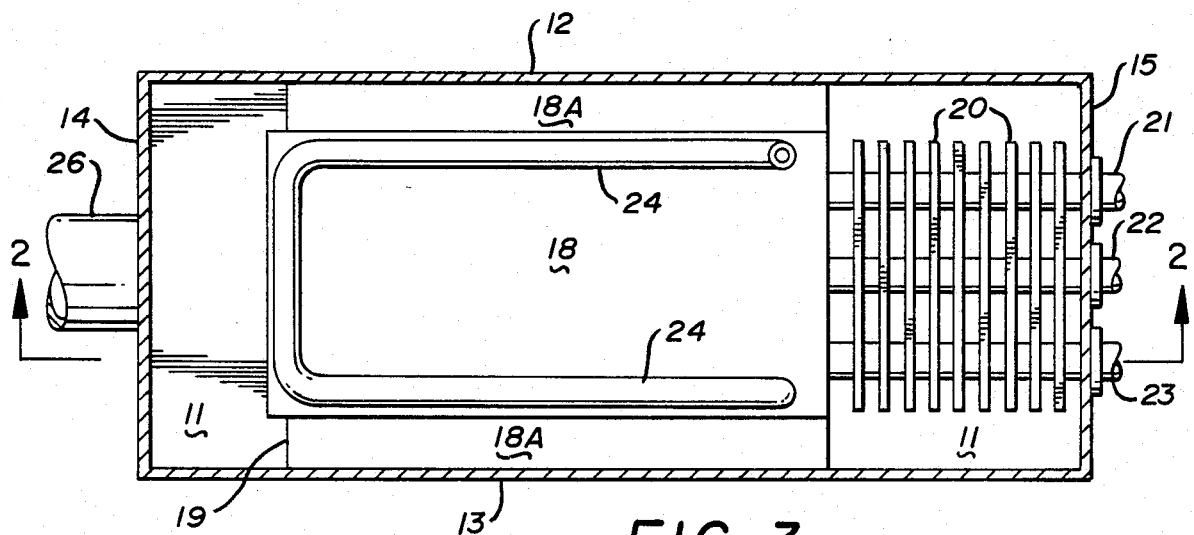
FIG. 3 is a horizontal section on line 3—3 of FIG. 2, section lines 2—2 on FIG. 3 indicate the section illustrated in FIG. 2.

In FIG. 3 of the drawings, a horizontal section on line 3—3 of FIG. 2 shows the layout of the hot fuel gas generator and emphasizes, along with the illustration on FIG. 2 of the drawings, the isolation of the secondary closed hollow body 18 which forms the novel mixing chamber for the gasified hydrocarbon and superheated steam produced by the device.

Figure 4:
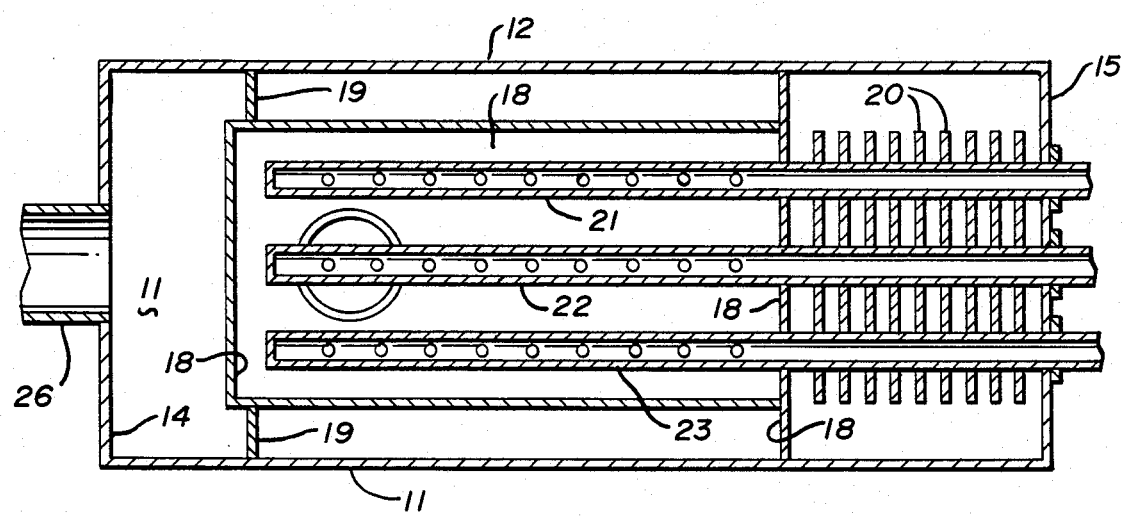
FIG. 4 is a horizontal section on line 4—4 of FIG. 2.

In FIG. 4 of the drawings, a horizontal section on line 4—4 of FIG. 2 of the drawings shows the respective positioning of the tubes 21, 22 and 23 which act in both gasifying the liquid hydrocarbon and creating superheated steam and directing the same into the secondary closed hollow body 18, all as hereinbefore described.

Figure 7:
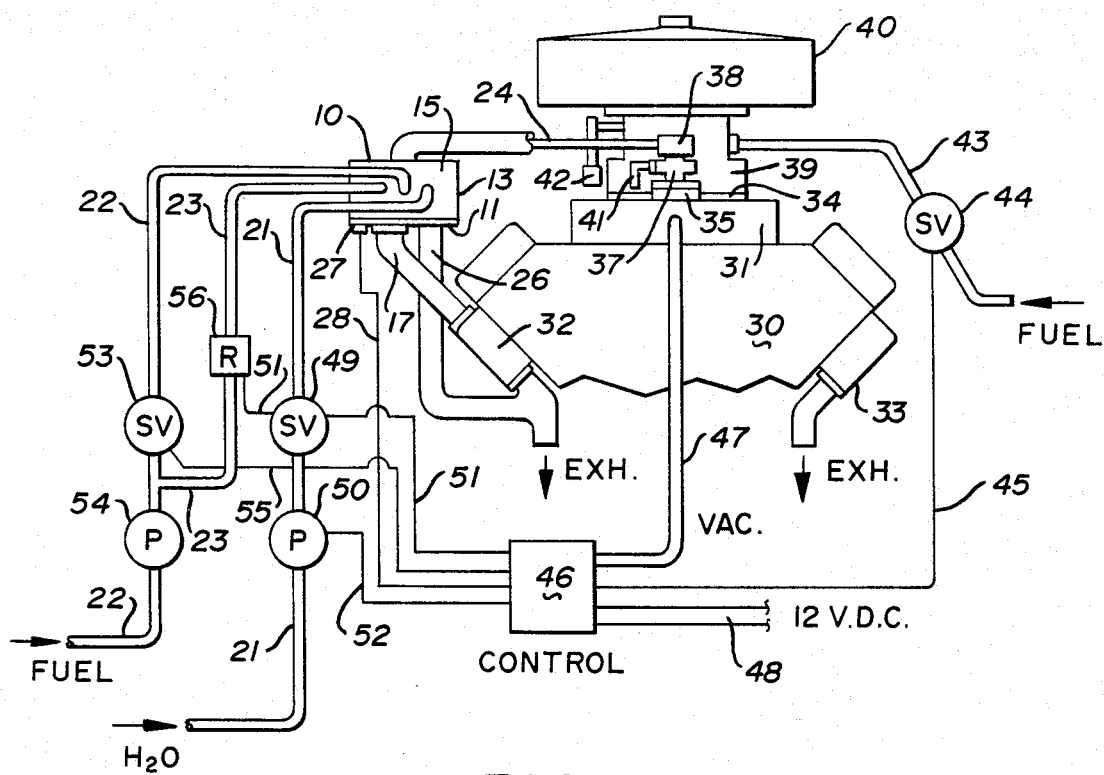
FIG. 7 is a diagrammatic elevation of a portion of an internal combustion engine, the hot fuel gas generator, and the means supplying fuel and water thereto and the controls for operating the same.

By referring now to FIG. 7 of the drawings, a diagrammatic elevation of the hot fuel gas generator of the present invention mounted on and arranged for supplying hot fuel gas to an internal combustion engine may be seen.

In FIG. 7 of the drawings, the internal combustion engine is indicated generally by the reference numeral 30, the inlet manifold thereof by the numeral 31, and the dual exhaust manifolds by the numerals 32 and 33 respectively. An adaptor plate 34 is shown positioned on the inlet manifold 31 in communication with the inlet ports thereof and an extension 35 of the adaptor plate 34 communicates with a passageway therein and supports a measuring valve 37. The hot gaseous fuel delivery tube 24 communicates with an inlet port 38 in the upper portion of the measuring valve 37. A carburetor 39 is positioned on the adaptor plate 34 and communicates with the orifices therein and with which orifices the passageway 36 in the adaptor plate also communicates as will be understood by those skilled in the art. An air cleaner 40 is carried on the upper end of the carburetor 39 as customary. Control linkage 41 on the measuring valve 37 is connected directly or indirectly to control linkage 42 of the carburetor, said control linkage 41 and 42 both extending to the accelerator by which the operation of the internal combustion engine is controlled. A liquid fuel supply line 43 communicates with the carburetor 39 by way of a solenoid valve 44 and electrical conductors 45 extend between the solenoid valve 44 in the fuel line 43 and a control generally indicated at 46. A vacuum tube 47 establishes communication with the inlet manifold 31 and the control means 46 and the control means 46 is supplied with electrical energy by conductors 48 which communicate with a 12 volt DC source, such as the battery in the equipped motor vehicle.

Still referring to FIG. 7, it will be seen that the hot fuel gas generator hereinbefore described in connection with FIGS. 1,2,3, and 4 of the drawings, is shown in communication with the measuring valve 37 by the delivery tube 24 which is illustrated with some of the usual insulation jacket thereon removed. The liquid fuel and water delivery tubes 21, 22 and 23 are shown entering the hot fuel gas generator elongated body through the end wall 15 thereof. The tubes 17 and 26 through which the hot exhaust gases from the internal combustion engine 30 enter and leave the elongated body member of the hot fuel gas generator are illustrated and the couple thermal 27 in the hot fuel gas generator is shown with its electrical conductors 28 extending to the control means 46. The tube 21 extends to a source of water by way of a controlling solenoid valve 49 and a pump 50, which supplies water under approximately 7 psi. The water is preferably mixed with a sufficient amount of alcohol to prevent freezing in cold weather. The solenoid valve 49 and the pump 50 are connected by electrical conductors 51 and 52 with the control means 46.

The tube 22 through which fuel, such as a liquid hydrocarbon, is introduced into the hot fuel gas generator is shown extending outwardly of the end wall 15 of the elongated hollow body to a source of fuel, such as gasoline, and by way of a solenoid valve 53 and a pump 54. The pump, which may be the usual fuel pump used in connection with gasoline fired internal combustion engines supplies fuel at pressure from 2 to 7 psi. The same pump 54 normally supplies the fuel to the solenoid valve 44 and the tube 43 which communicates with the carburetor 39 hereinbefore referred to.

Electrical conductors 55 extend from the solenoid valve 53 to the control means 46. The tube 23, which also supplies liquid fuel to the hot fuel gas generator, communicates with the tube 22 downstream of the pump 54 and preferably by way of a pressure regulator 56 which provides a convenient means of regulating the amount of fuel delivered through the pipe 23 and thus enabling the hot fuel gas generator to be readily adjusted to various hot fuel gas volumes as may be required on different motor vehicles.

Figure 5:
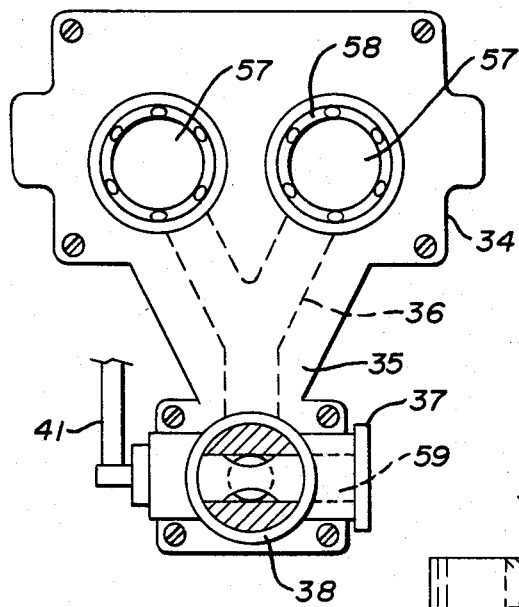
FIG. 5 is a top plan view of an adaptor plate used in a fuel system incorporating the hot fuel gas generator of FIG. 1.
Figure 6:
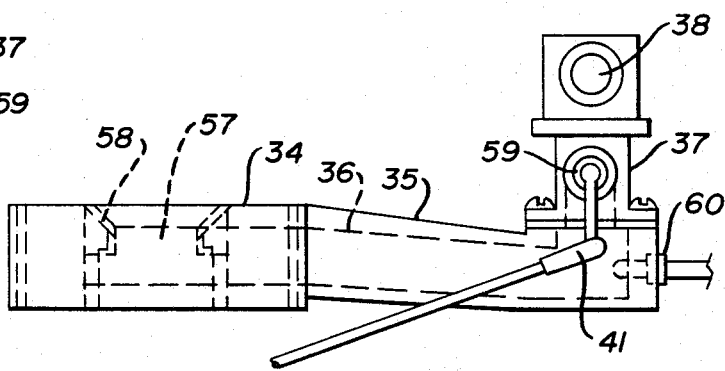
FIG. 6 is a side elevation of the adaptor plate of FIG. 5.

By referring now to FIGS. 5 and 6 of the drawings, the adaptor plate 34 heretofore referred to may be seen in top plan and side views. In FIG. 5, the top plan view, the bores 57 extending therethrough communicate with the interior of the inlet manifold 31 and are defined by snap-in sizing rings 58 which are apertured and establish communication with the passageway 36 in the adaptor plate 34 which communicates with the measuring valve 37. The measuring valve 37 is preferably of the cylindrical type wherein a revolvable cylindrical shape 59 has oppositely disposed cutaway areas therein so arranged that rotation of the cylindrical element 39 varies the flow of the hot fuel gas controlled by the measuring valve and responsive to the accelerator linkage 41 as hereinbefore described.

In FIG. 6 of the drawings, the passageway 35 will be seen to encircle each of the bores 57 so as to establish communication with the hollow snap-in rings 58 by which the hot fuel gas is uniformly delivered to the bores 57 and thence into the inlet manifold 31 of the internal combustion engine.

By referring again to FIG. 7 of the drawings, it will be seen that the various interconnecting fuel, water, and combustion air sources and the means controlling them are so arranged that when the equipped internal combustion engine is cold at the time of starting, the solenoid valve 44 is opened by a temperature sensor in the inlet manifold 31 or in the extension 35 of the adaptor plate 34 as indicated in FIG. 6 by the reference numeral 60. At the same time, the input of one or the other or both of such sensors enables the control 46 to close the solenoid valves 49 and 53 and the pressure regulator 56 so that the internal combustion engine is started with the usual carburetor 39 operating in the normal manner. In a minute or two, the exhaust gases in the exhaust manifold 32 being directed through the hot fuel gas generator outermost elongated hollow body by the pipes 17 and 26 rapidly build up a temperature therein to a normal 900° F. whereupon the sensor 27 originates a signal to the control means 46 which acts to open the solenoid valve 53 and the pressure regulator 56 so that fuel from the fuel pump 54 is directed into the tubes 22 and 23 where it is vaporized in the finned tube area thereabout defined by the fins 20 and delivered into the secondary closed hollow body 18 through the perforations in the tubes 22 and 23. The hot gaseous fuel then flows through the delivery tube 24 into the measuring valve 37 and through the passageways in the adaptor plate 34 and its extension 35 into the bores of the adaptor plate and into the inlet manifold 31. When this occurs, the sensor 27 in the hot fuel gas generator signals the control means 46 which in turn closes the solenoid valve 44 and thereby discontinues the supply of fuel to the carburetor 39 and the internal combustion engine thereafter operates on the hot fuel gas.

At such time as the control means 46 determines inlet manifold pressure at 10 inches indicating operation of the internal combustion engines at greater than idling speeds, the control means 46 energizes the pump 50 and the solenoid valve 49 on the water supply line and the desired relatively small quantity of water is delivered to the tube 21, converted into superheated steam and mixed with the gaseous fuel in the secondary closed hollow body 18 of the hot fuel gas generator.

At such time as the engine returns to idling speed and the vacuum or minus atmospheric pressure in the inlet manifold 31 rises above 10 inches, the control 46 closes the solenoid valve 49 and stops the delivery of water into the hot fuel gas generator.

It will occur to those skilled in the art that the addition of the desired amounts of water to the hot fuel gas generator results in the hereinbefore explained wider separation of the molecules of the fuel to insure more complete combustion and at the same time slows the combustion rate in the manner of an anti-knock compound. More importantly, the addition of the controlled amounts of superheated steam prevents auto ignition or pre-ignition which otherwise occurs when heated vaporized or gaseous fuel is supplied to an internal combustion engine.

It will thus be seen that an improved hot fuel gas generator for an internal combustion engine has been disclosed which operates efficiently at all speeds and enables a substantially greater utilization of the energy in liquid hydrocarbons, such as gasoline, by at least doubling the miles per gallon in a vehicle equipped with the device.

Having thus described my invention, what I claim is:

1. An improvement in a fuel supplying system for an internal combustion engine having inlet and exhaust manifolds with inlet and outlet ports, a fuel conducting device in communication with said inlet manifold, controlled air supplying means in communication with said device, a measuring valve in communication with said fuel conducting device; the improvement comprising a hot fuel gas generator upstream of said measuring valve in said fuel supplying system, said hot fuel gas generator comprising a first hollow body of a known size, a second smaller hollow body with said first hollow body positioned in spaced relation thereto, inlet and outlet ports in said first hollow body, means connecting said inlet port in said first hollow body with said exhaust manifold outlet port, at least two tubes positioned in said first hollow body and having portions of said tubes extending exteriorly of said first hollow body and other portions of said tubes extending into said second hollow body, said portions of said tubes in said second hollow body having openings therein, fins on said portions of said tubes in said first hollow body, baffles in said first hollow body positioned to guide hot exhaust gases from the inlet port in said first hollow body around said second hollow body and against said fins on said tubes in said first hollow body so that said tubes form heat exchangers vaporizing fluids therein, fuel supplying means in communication with at least one of said tubes, a delivery tube in said first hollow body communicating with said second hollow body and extending exteriorly of said first hollow body and communicating with said measuring valve in communication with said fuel conducting device.

2. The improvement in a fuel supplying system set forth in claim 1 and wherein said fuel conducting device comprises a hollow adapter plate having an outlet opening in registry with said inlet port in said inlet manifold, and wherein said measuring valve is positioned on said adapter plate and in communication with a first inlet opening in said adapter plate and wherein said controlled air supplying means is in communication with a second inlet opening in said adapter plate.

3. The improvement in a fuel supplying system for an internal combustion engine set forth in claim 1 including a source of liquid fuel and means establishing communication between said source of liquid fuel and one of said tubes, a liquid fuel control valve positioned in said means of communication between said source of liquid fuel and said one of said tubes, temperature sensor means in said engine for emitting signals representative of temperatures therein, said liquid fuel control valve coupled to said temperature sensor means and responsive to said signals for controlling liquid fuel supplied to said hot fuel gas generator.

4. The improvement in a fuel supplying system for an internal combustion engine set forth in claim 1 and wherein said first and second hollow bodies are elongated tubular members having closed ends and wherein said first hollow body defines a chamber substantially double the size of said second hollow body, said baffles in said first hollow body extending longitudinally thereof between the same and the second hollow body and transversely of said first hollow body and between the same and said second hollow body with said transversely extending baffles being positioned between said inlet and outlet ports in said first hollow body so as to form a tortuous passageway for said hot exhaust gases around said second hollow body.

5. The improvement in a fuel supplying system for an internal combustion engine set forth in claim 1 and wherein said openings in said portions of said tubes in said second hollow body are sized to form mixing jets for said vaporized fluids directed thereby into said second hollow body.

6. The improvement in a fuel supplying system for an internal combustion engine set forth in claim 1 including a source of water and means establishing communication between said source of water and one of said tubes, a water control valve positioned in said means of communication between said water source and said one of said tubes, said inlet manifold coupled to said water control valve and responsive to inlet manifold pressure for controlling water supplied to said hot fuel gas generator.

7. The improvement in a fuel supplying system for an internal combustion engine set forth in claim 6 including signal comparator/controller means and wherein a tubular member communicates with said inlet manifold and said signal comparator/controller means and wherein said signal comparator/controller means coupled to said tube communicating with said inlet manifold is responsive to variations in inlet manifold pressure for controlling water supplied to said hot fuel gas generator.

* * * * *